United States Patent
Phelan et al.

(10) Patent No.: US 9,285,068 B2
(45) Date of Patent: Mar. 15, 2016

(54) RETENTION SYSTEM AND METHOD FOR A WING

(71) Applicant: Becklin Holdings, Inc., Reno, NV (US)

(72) Inventors: Matthew P. Phelan, Grants Pass, OR (US); Adrian P. Tayne, Grants Pass, OR (US)

(73) Assignee: Becklin Holdings, Inc., Reno, NV (US)

( * ) Notice: Subject to any disclaimer, the term of this patent is extended or adjusted under 35 U.S.C. 154(b) by 238 days.

(21) Appl. No.: 13/974,388

(22) Filed: Aug. 23, 2013

(65) Prior Publication Data

US 2015/0053842 A1 Feb. 26, 2015

(51) Int. Cl.
*B64C 27/50* (2006.01)
*F16M 9/00* (2006.01)
*B64C 39/02* (2006.01)
*F16B 2/10* (2006.01)
*F16B 43/00* (2006.01)

(52) U.S. Cl.
CPC ............... *F16M 9/00* (2013.01); *B64C 39/024* (2013.01); *F16B 2/10* (2013.01); *F16B 43/003* (2013.01); *B64C 2201/201* (2013.01)

(58) Field of Classification Search
CPC ............ B64C 27/50; B64C 2201/201; B64C 2201/208; B64C 2201/206; B64C 2201/205; F16M 13/022; F16B 2/10; Y10T 24/44231
USPC ............ 248/316.1, 316.7, 231.81, 228.7, 689
See application file for complete search history.

(56) References Cited

U.S. PATENT DOCUMENTS

| | | | |
|---|---|---|---|
| 2,847,014 A * | 8/1958 | Cohen | A61B 17/2812 606/201 |
| 3,160,288 A * | 12/1964 | Kelly | B64F 1/22 212/270 |
| 4,301,982 A * | 11/1981 | Tiemann | B64C 27/50 244/17.11 |
| 4,445,657 A * | 5/1984 | Breckenridge | A01M 7/0053 24/489 |
| 5,772,269 A * | 6/1998 | Henning, Jr. | B66C 1/18 294/67.22 |
| 6,568,644 B2 * | 5/2003 | Pedersen | B62J 7/08 224/309 |
| 6,769,644 B2 * | 8/2004 | Muylaert | B64C 27/50 244/17.11 |
| 7,207,519 B2 * | 4/2007 | Hoynash | B64C 27/50 244/17.11 |
| 7,980,522 B2 * | 7/2011 | Anderson | B25B 5/14 244/17.11 |
| 2002/0125282 A1 * | 9/2002 | Laverack | B60R 9/045 224/319 |

* cited by examiner

*Primary Examiner* — Rodney Mintz
*Assistant Examiner* — Daniel Kenny
(74) *Attorney, Agent, or Firm* — Lowe Graham Jones PLLC (57) ABSTRACT

A retention system includes a base supporting a wing spar and a post extending through the base from a first side of the base to a second side of the base. The post inserts through an aperture in the spar. A stop is selectively securable to the post over the second side of the base. A locking member engages the post on the first side of the base. The locking member is configured to selectively move the post from an unlocked position to a locked position in which the post is withdrawn toward the first side relative to the unlocked position. A biasing member encircles the post and is positioned between the stop and the second side. When the locking member is in a closed position the biasing member expands to engage the aperture and resist movement of the wing spar. A plurality of cradles may support the wing.

18 Claims, 12 Drawing Sheets

RETENTION SYSTEM AND METHOD FOR A WING

FIELD OF THE INVENTION

This application relates to systems and methods for storing and shipping an aerial vehicle, such as an unmanned aerial vehicle (UAV).

BACKGROUND OF THE INVENTION

The capabilities and use of UAVs has exploded in recent years. Some UAVs have the capacity of performing long distance surveillance as well as launching missiles. Inasmuch as a UAV has no pilot, it is often inconvenient to fly a UAV to a theatre of operation that exceeds the operational range of the drone. However, UAVs are very sophisticated machines and can also be very large.

Accordingly, it would be an advancement in the art to provide an improved means for shipping and storing a UAV.

SUMMARY OF THE INVENTION

In one aspect of the invention, one or more cradles are used to support a wing. The cradle may include first and second clamping members pivotally coupled to one another and defining a pivot axis. The first clamping member defines a first surface and the second clamping member defines a second surface. The first and second surfaces each conform to a portion of an airfoil contour of the wing and include a cushioning material. A first trough member defines a channel substantially parallel to the pivot axis and defines a third surface conforming to one of a leading edge and a trailing edge portion of the wing. In some embodiments, the trailing edge and its control surfaces are not contacted by the cradle as they are delicate. In such embodiments, the cradle contours the wing up until the control surface at which point clearance is made to avoid contact. The first trough member is positioned to engage the leading edgeportion when the wing is positioned within the first and second clamping members. A locking member engages the first and second clamping members and is configured to selectively lock the first and second clamping members having the first and second surfaces engaging the wing.

In another aspect of the invention, the first and second clamping members each include a frame and a layer of the cushioning material secured to the frame. In some embodiments, the frame includes first and second end plates and a plurality of rods secured between the first and second end plates and extending through the layer of cushioning material. The layer of cushioning material may include a plurality of cushioning members each having at least one surface that is substantially conformal to a portion of a contour of the wing at at least one longitudinal position. The layer of cushioning material may extend outwardly from the first and second end plates. The first and second end plates may define inward facing edges that are substantially conformal to the wing at the at least one longitudinal position.

Systems and methods for using the cradle are also disclosed and claimed.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
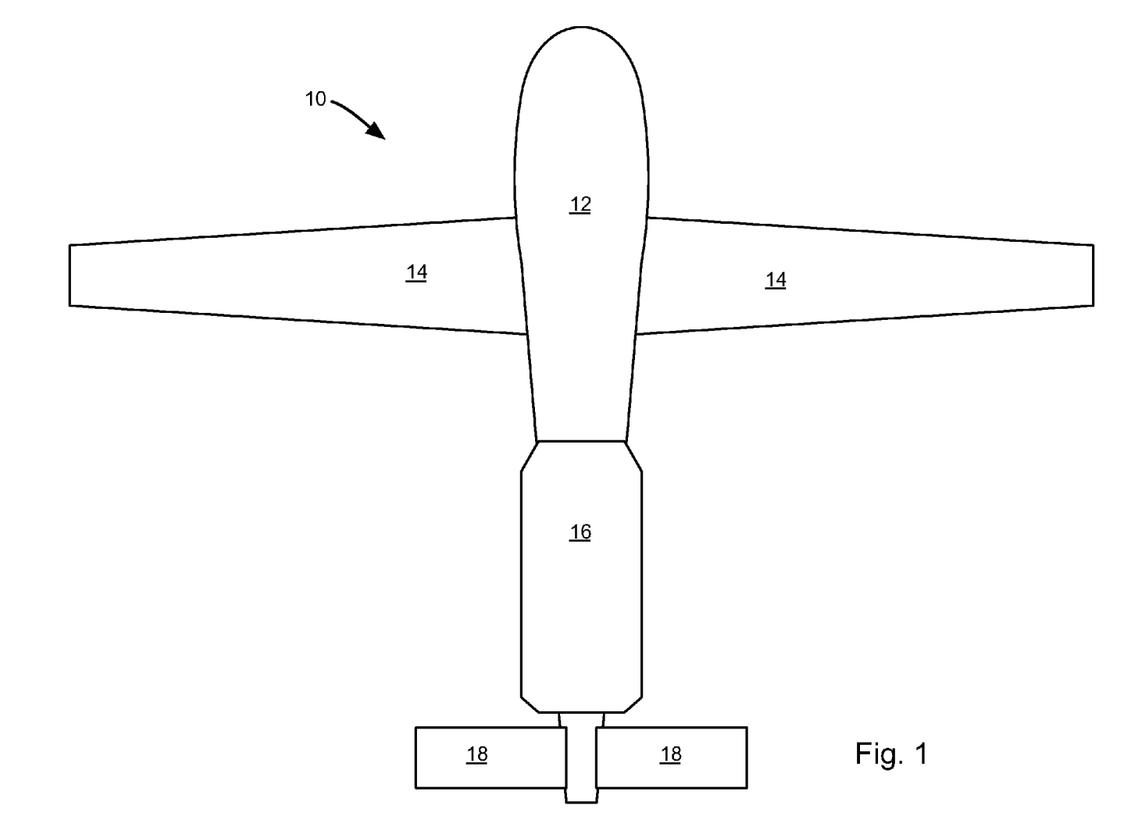
FIG. 1 is a top plan view of an exemplar UAV such as might be used in accordance with an embodiment of the present invention.

Referring to FIG. 1, a UAV 10 may be embodied as a fixed-wing aircraft having a fuselage 12. Wings 14 extend laterally from the fuselage 12 may define an airfoil contour. One or more propulsion sources 16 are mounted to the fuselage 12 or the wings 14. The propulsion source 16 may be embodied as an internal combustion engine coupled to a propeller, turbo fan, or the like. The propulsion source 16 may also be embodied as a jet engine coupled to a propeller or turbo fan or used alone.

One or more tail planes 18 defining an empennage of the UAV 10 may secure to a rearward end of the fuselage 12. The tail planes 18 may define a conventional horizontal stabilizer and vertical stabilizer with corresponding elevator and rudder control surfaces. Alternatively, tail planes 18 may include a pair of angled tail planes each with a corresponding control surface and protruding upwardly or downwardly from the fuselage 12.

Figure 2:
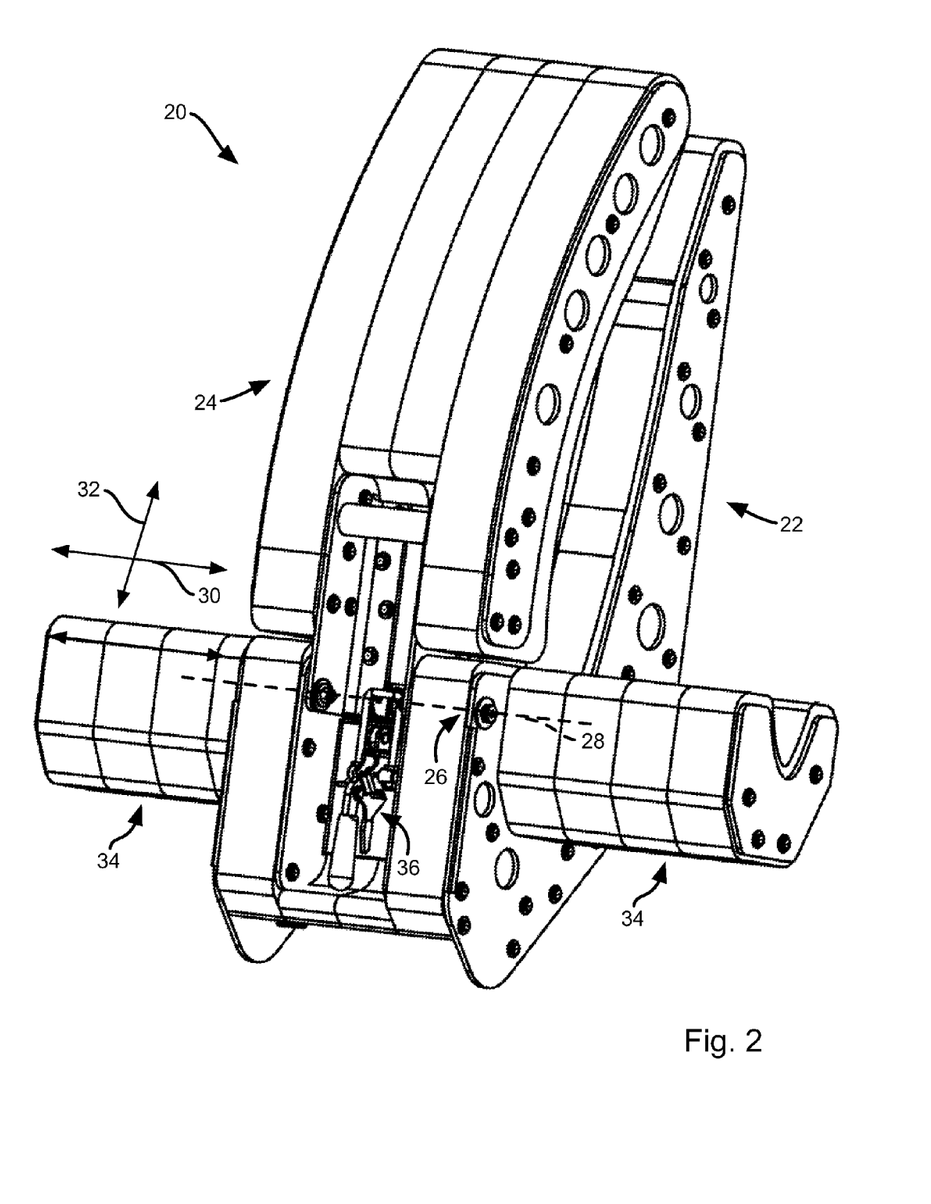
FIG. 2 is a perspective view of a cradle for a wing in accordance with an embodiment of the present invention.

Referring to FIG. 2, a cradle 20 may include a rear clamping member 22 and a front clamping member 24. The front clamping member 24 may pivotally secure to the rear clamping member 22 by means of a pivot 26 defining a pivot axis 28. In the illustrated embodiment, the pivot axis 28 is substantially parallel to a longitudinal direction 30. The longitudinal direction 30 may be defined along a longitudinal direction of a wing clamped within the cradle 20. A vertical direction 32 may also be defined as perpendicular to the longitudinal direction 30. The vertical direction 32 may be substantially parallel to the chord line of a wing positioned in the cradle 20. For purposes of this disclosure "substantially" parallel or perpendicular may be interpreted as within 10 degrees of perpendicular or parallel, preferably within 5 degrees, and preferably within 1 degree, of perpendicular or parallel. Likewise, "substantially" equal to a value may mean within +/−5% of the value, preferably within 1% of the value.

In some embodiments, troughs 34 may extend on either side of the front and rear clamping members 22, 24. The troughs 34 may be positioned on one or both sides of the clamping members 22, 24 along the longitudinal direction 30. As shown in FIG. 2, pivot axis 28 may be located vertically adjacent the troughs 34. Stated differently, the troughs 34 may be secured to the rear clamping member 24 near the pivot axis 28. In some embodiments, the extent of each trough 34 in the longitudinal direction is between 0.5 and 2, preferably between 0.9 and 1, times a width of the rear clamping member 22. In the illustrated embodiment, each trough 34 has a width substantially equal to the width of the rear clamping member 22.

A locking member 36 engages the front and rear clamping members 22, 24. The locking member 36 may selectively lock the front and rear clamping member 22, 24 relative to one another with a desired amount of locking force. For example, the locking member 36 may be any over-center latch known in the art. Inasmuch as a wing stored in the cradle 20 may be shipped by air, the over-center latch is preferably lightweight. The latching force may be defined by the latch and may be adjustable as known in the art.

Figure 3:
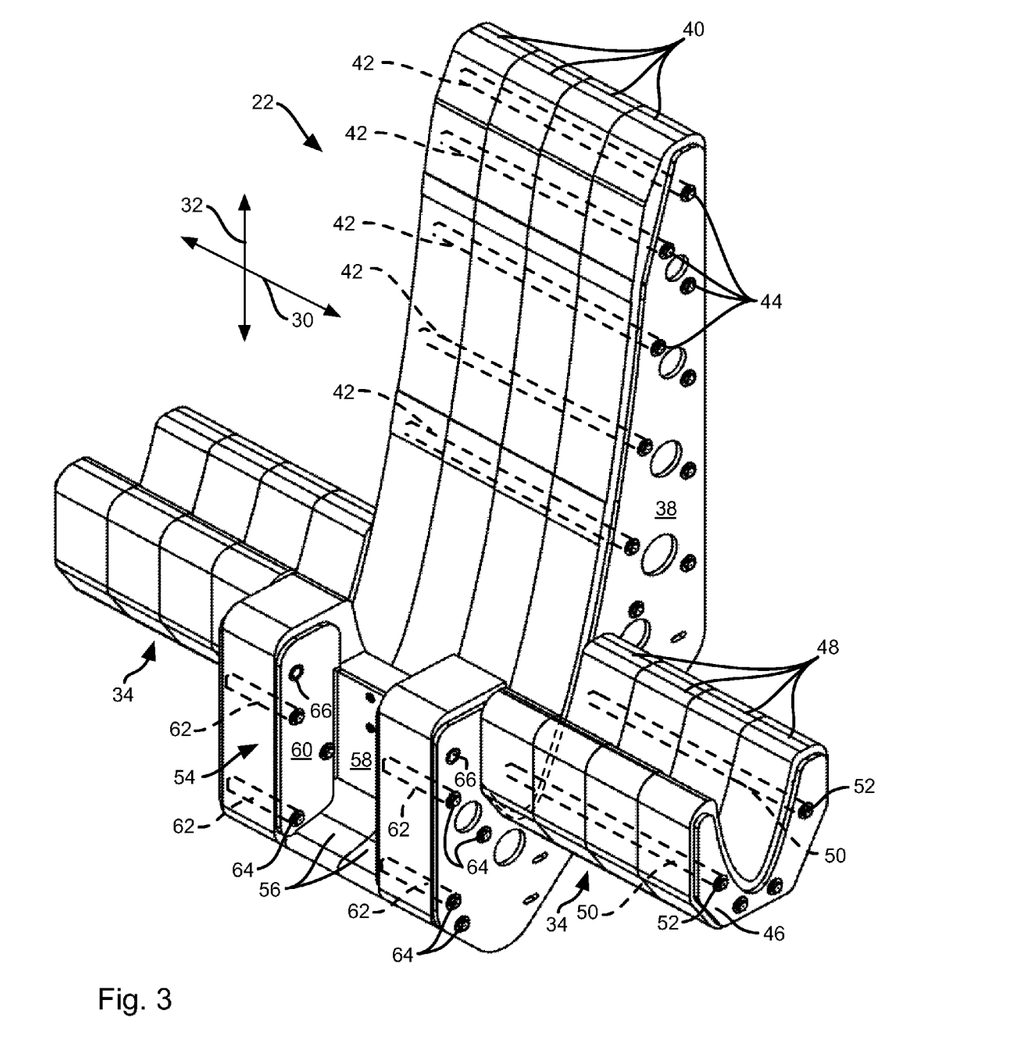
FIG. 3 is an isometric view of a rear clamping member in accordance with an embodiment of the present invention.

Referring to FIG. 3, in some embodiments a rear clamping member 22 may be as illustrated. The rear clamping member 22 may include cushioning members 40. For example, one or more cushioning members 40 may be positioned between end plates 38. In the illustrated embodiments, the cushioning members 40 are sheets of a cushioning material cut to a desired shape. The illustrated rear clamping member 22 may be symmetric about a plane perpendicular to the longitudinal axis 30. Accordingly, for the illustrated end plate 38 a corresponding end plate 38 is located on an opposite side in a mirror configuration. The plates 38 may be fastened to one another such that the cushioning members 40 are captured between the plates. For example, each rod 42 of a plurality of rods 42 may secure to both plates 38 and further extend through the cushioning members 40 positioned between the plates 38. The rods 42 and plates 38 may be formed of a rigid but light weight material such as aluminum, a rigid plastic, composite material, or the like. The rods 42 may therefore serve to limit compression of the cushioning member 40. The rods 42 may have circular, rectangular, or some other cross section. In the illustrated embodiment, the rods 42 are secured to the end plates 38 by means of fasteners 44 passing through end plates 38 and engaging an end portion of a rod 42. In some embodiments, a rod 42 may define interior or exterior threads engaging corresponding threads on the fastener 44. In other embodiments, the fasteners 44 may be embodied as star fangled nuts and a rod 42 may define a hollow end portion for securing to a star fangled nut. In some embodiments, a backing plate is secured to both end plates 38, such as by means of welds or other fasteners, and the cushioning members 40 are secured to the backing plate by means of adhesive or some other means.

In a like manner, a trough 34 may be defined by cushioning members 48 defining the contour of the trough 34. The cushioning members 48 may be captured between an end plate 38 and an end plate 46. Likewise, rods 50 may secure to the end plate 38 and the plate 46 in order to capture the cushioning members 48. The rods 50 may pass through the cushioning members 48. The rods 50 may secure to the end plate 46 and end plate 38 by any of the fastening means noted above, such as fasteners 52 embodied as star fangled nuts or some other fastener.

In some embodiments, a locking member 36 may mount to the rear clamping member 22 by means of a lock mount 54 secured thereto. In the illustrated embodiment, one or more of the cushioning members 40 may define a cutout portion 56 for receiving the lock mount 54. As is apparent in FIG. 3, the cutout portion 56 does not extend completely through the cushioning member such that the hard material forming the lock mount 54 does not contact a wing positioned in the cradle 20. Stated differently, a portion of one or more of the cushioning members 40 remains positioned between the lock mount 54 and a wing positioned between the clamping members 22, 24.

The lock mount 54 may include a back plate 58 and side plates 60 extending outwardly from the back plate 58. The side plates 60 may secure to the back plate 58 by means of screws, bolts, welds, or some other fastening means. In some embodiments, the back plate 58 and side plates 60 are formed from one monolithic member, such as a channel or rectangular tube having one wall removed. In the illustrated embodiment, the side plates 60 secure to the end plates 38 by means of rods 62 extending through one or more of the cushioning members and secured to the end plates 38 and plates 60 by means of fasteners 64, such as star fangled nuts or some other fastening means. One or both of the end plates 38 and side plates 60 may define an aperture 66 for receiving a pivot 26, such as one or more pivot pins 26, extending through the apertures 66.

Figure 4:
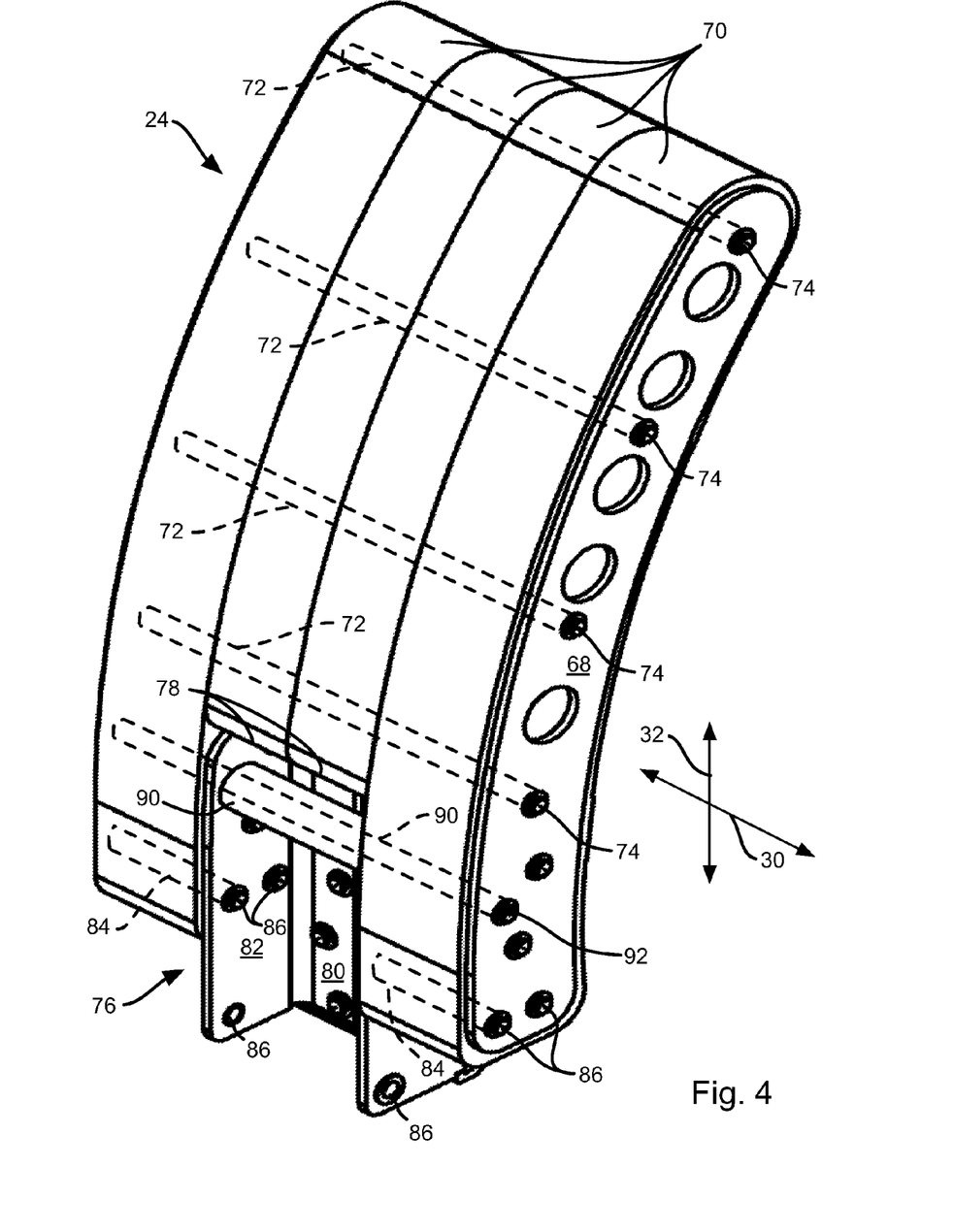
FIG. 4 is an isometric view of a front clamping member in accordance with an embodiment of the present invention.

Referring to FIG. 4, in some embodiments a front clamping member 24 may be as illustrated. The front clamping member 24 may include cushioning members 70. For example, one or more cushioning members 70 may be positioned between end plates 68. In some embodiments, the cushioning members 40, 48, 70 may include a polymer, such as a foam polymer, that has a modulus of elasticity of between 0.001 and 1 GPa, and preferably between 0.01 and 0.1 GPa. This modulus of elasticity may refer to the polymer itself or the polymer after any foaming process. The illustrated front clamping member 24 is symmetric about a plane perpendicular to the longitudinal axis 30. Accordingly, for the illustrated end plate 68 a corresponding end plate 68 is located on an opposite side in a mirror configuration. The plates 68 may be fastened to one another such that the cushioning members 70 are captured between the plates 68. For example, each rod 72 of a plurality of rods 72 may secure to both plates 78 and further extend through the cushioning members 70 positioned between the plates 68. The rods 72 may have circular, rectangular, or some other cross section. In the illustrated embodiment, the rods 72 are secured to the end plates 68 by means of fasteners 74 passing through end plates 68 and engaging an end portion of a rod 72. In some embodiments, a rod 72 may define interior or exterior threads engaging corresponding threads on a fastener 74. In other embodiments, the fasteners 74 may be embodied as star fangled nuts and the rods 72 may define a hollow end portion for securing to a star fangled nut. In some embodiments, a backing plate is secured to both end plates 68, such as by means of welds or other fasteners, and the cushioning members 70 are secured to the backing plate by means of adhesive or some other means.

In some embodiments, a locking member 36 may mount to the front clamping member 24 by means of a lock mount 76 secured thereto. In the illustrated embodiment, one or more of the cushioning members 70 may define a cutout portion 78 for receiving the lock mount 76. As is apparent in FIG. 3, the cutout portion 78 does not extend completely through the cushioning member 70 such that the hard material forming the lock mount 76 does not contact a wing positioned in the cradle 20. Stated differently, a portion of the cushioning member 70 is interposed between the lock mount 76 and a wing clamped by the front clamping member 24.

The lock mount 76 may include a back plate 80 and side plates 82 extending outwardly from the back plate 80. The side plates 82 may secure to the back plate 80 by means of screws, bolts, welds, or some other fastening means. In some embodiments, the back plate 80 and side plates 82 are formed from one monolithic member, such as a channel or rectangular tube having one wall removed In the illustrated embodiment, the side plates 82 secure to the end plates 68 by means of rods 84 extending through one or more of the cushioning members 70 and secured to the end plates 68 and plates 82 by means of fasteners 86, such as star fangled nuts or some other fastening means. One or both of the end plates 68 and side plates 82 may define an aperture 86 for receiving a pivot 26, such as one or more pivot pins 26, extending through the apertures 86 and the apertures 66 of the rear clamping plate 22.

In some embodiments, a bushing 90 extends between the side plates 82. A rod 90 may pass between opposing end plates 68 and pass through the bushing 90 as well as the side plates 82. The rod 90 may secure to the end plates 68 by means of fastener 92 in the same manner of other rods discussed hereinabove.

Figure 5:
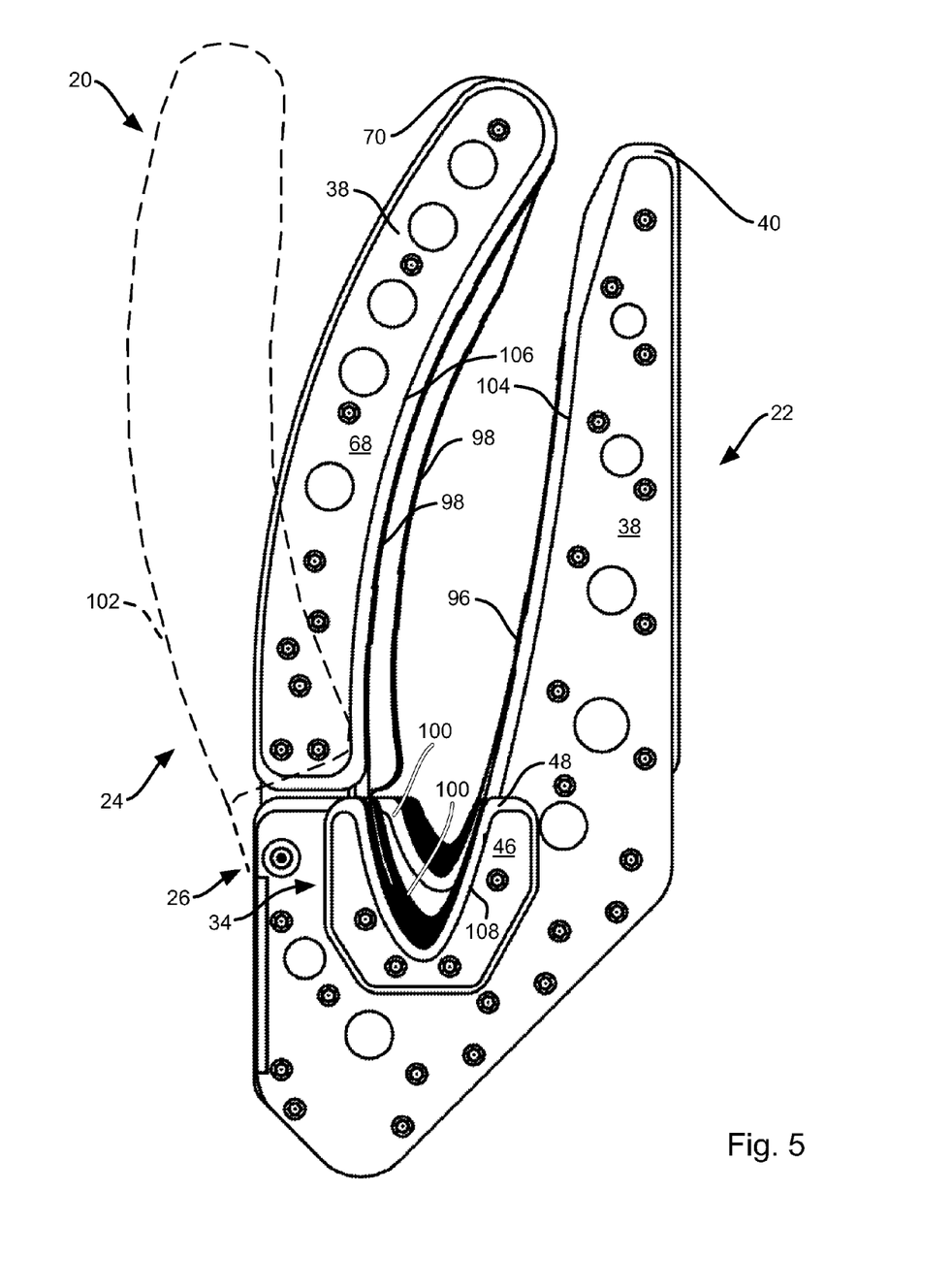
FIG. 5 is a side view of a cradle in accordance with an embodiment of the present invention.

Referring to FIG. 5, the front clamping member 24 pivotally secures to the rear clamping member 22 by means of the pivot 26. In this manner, the front clamping member 24 may be pivoted away from the rear clamping member 22 in order to permit insertion of a wing, as shown by the dotted representation 102 of the front clamping member.

The cushioning members 40 of the rear clamping member 22 and the cushioning members 70 of the front clamping member 24 define conformal surfaces 96, 100 that are shaped to conform to surfaces of a wing. Likewise, the cushioning members 48 of the trough 34 define conformal surfaces 100 conforming to one of a leading edge portion and a trailing edge portion of a wing. As noted above, in some embodiments, contact between the cradle 20 and the trailing edge of the wing 14 and any control surfaces is avoided. As known in the art, the cross-sectional shape of a wing preferably varies along the length thereof. Accordingly, the conformal surfaces 96, 98, 100 may conform to the surface of a wing at a particular longitudinal position. Likewise, for a given cradle 20, the plurality of cushioning members 40 may each have a unique corresponding conformal surface 96 corresponding to a contour of the wing at a particular longitudinal position. Likewise each of the plurality of cushioning members 48 may have a unique conformal surface 100 and each of the plurality of cushioning members 70 may have a unique conformal surface 98. In some embodiments, the conformal surfaces 96, 98, 100 are cut such that they are contoured in both vertical 32 and horizontal directions (e.g. in the plane of the page of FIG. 5) and the longitudinal direction 30 in order to conform to variation in the contour of the wing in three dimensions. In other embodiments, the conformal surfaces 96, 98, 100 are uniform in the longitudinal direction such that the conformal surfaces 96, 98, 100 are contoured in only two dimensions (horizontal and vertical). For example, the arbitrary contours of the conformal surfaces 96, 98, 100 may be machined using a water jet cutter or other machining process that may machine precise contours in two dimensions.

In some embodiments, some or all of the conformal surfaces 96, 98, 100 may include a pattern of ridges or other protuberances that are positioned to be located over structural reinforcements under the skin of the wing 14 at the longitudinal location at which the conformal surfaces 96, 98, 100 engage the wing 14. In this manner, pressure exerted on the wing is more concentrated on those areas that are better able to bear such pressure.

In some embodiments, the end plates 38, 46, 68 may define conformal edges 104, 106, 108 respectively that extend along the conformal surfaces 96, 98, 100. The conformal edges may substantially conform to a surface that is offset from a contour of the wing contour by some constant or variable gap, such that during use, the cushioning members 40, 48, 70 will not compress to the point that the wing contacts the end plates 38, 46, 68 under expected compression forces and amounts. As noted above, the various cushioning members 40, 46, 70 of a cradle may not all have conformal surfaces 96, 98, 100 of the same shape. In such embodiments, each end plate 38 may have a conformal edge 104, 106, 108 that is offset from the conformal surface 96, 98, 100 of the cushioning members 40, 46, 70 adjacent thereto (e.g. the outermost cushioning members 40, 46, 70.

Figure 6:
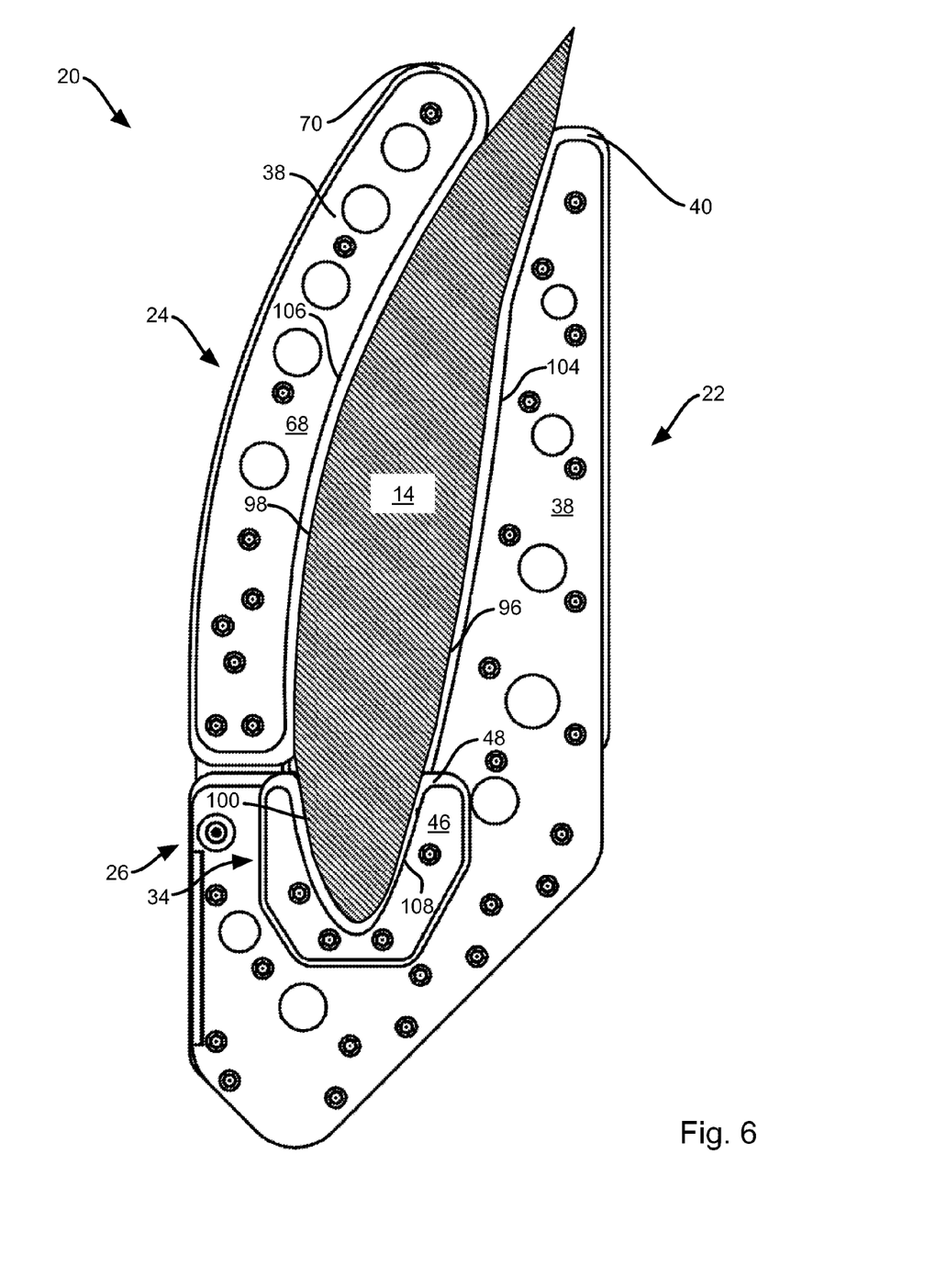
FIG. 6 is a side view of a cradle having a wing positioned therein in accordance with an embodiment of the present invention.

Referring to FIG. 6, in use a wing 14 may be placed between the front and rear clamping members 22, 24 and the front clamping member 24 may be pivoted toward the rear clamping member 22. As shown in FIG. 6, the leading edge portion of the wing 14 rests in a concave portion of the rear clamping member 22 and the trough 34. The locking member 36 (FIG. 2) may then be engaged to apply a consistent clamping force between the clamping members 22, 24. As a result of the clamping force, the cushioning members 40, 46, 70 may compress due to engagement of the wing 14 with the conformal surfaces 96, 98, 100. As noted above, the compression is preferably such that the wing 14 does not contact the end plates 38, 46, 68.

Figure 7:
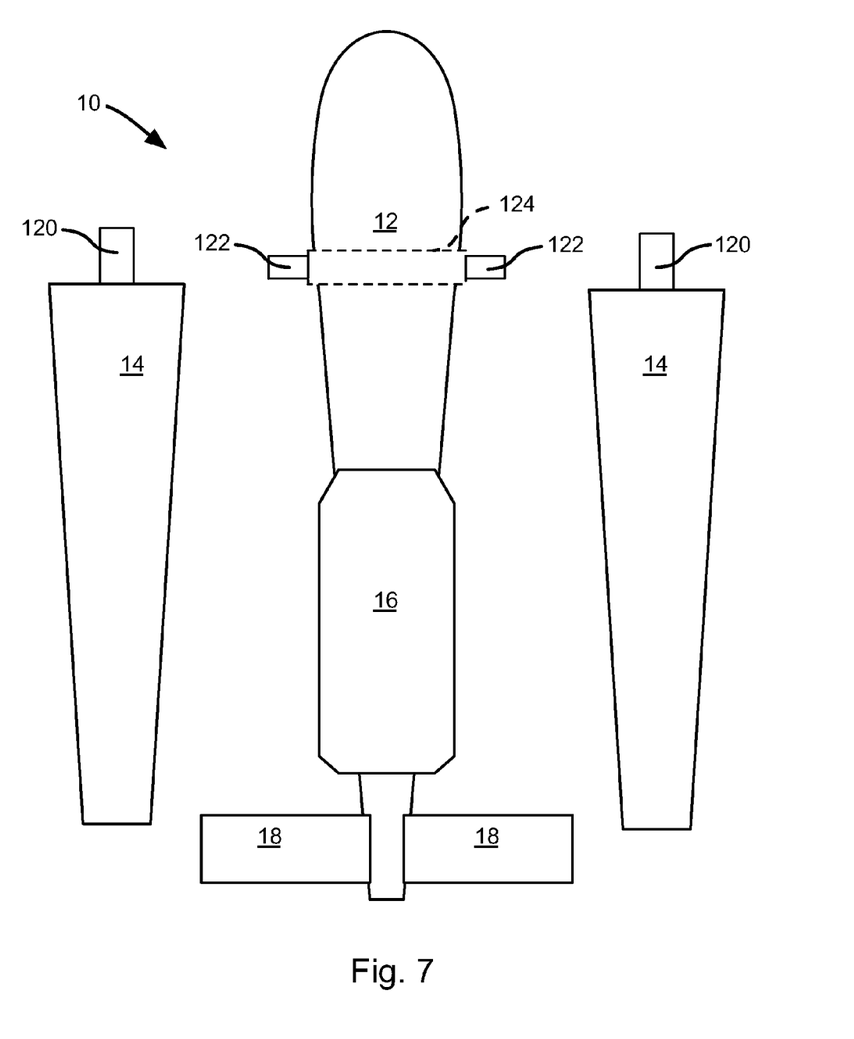
FIG. 7 is a top plan view of a disassembled UAV in accordance with an embodiment of the present invention.

Referring to FIG. 7, to facilitate shipping and storage, the UAV 10 may be disassembled. As shown in FIG. 7 at least the wings 14 may be removed to reduce the footprint of the UAV 10. Other parts of the UAV 10 such as the propulsion source 16 and tail planes 18 may also be removed. The wings 14 may secure to the fuselage by means of a wing spar 120. As known in the art, a wing spar 120 provides structural rigidity to the wing 14 for transferring lift forces to the fuselage 12. In some embodiments, wings 14 may secure by some other means or interface other than wing spars 120, such as a plate or other structure defining a hole pattern for receiving fasteners. Following shipment or storage according to methods disclosed herein, the wings 14 may be reattached to the fuselage 12 using the wing spars 120 in order to deploy the UAV 10.

The fuselage 12 may have indexing members 122 fastened thereto using a fastening system 124. The fastening system 124 may be a fastening system and corresponding indexing members 122 as disclosed in U.S. application Ser. No. 13/974,350 filed Aug. 23, 2013 and entitled FUSELAGE INDEXING SYSTEM AND METHOD, which is hereby incorporated herein by reference.

Figure 8:
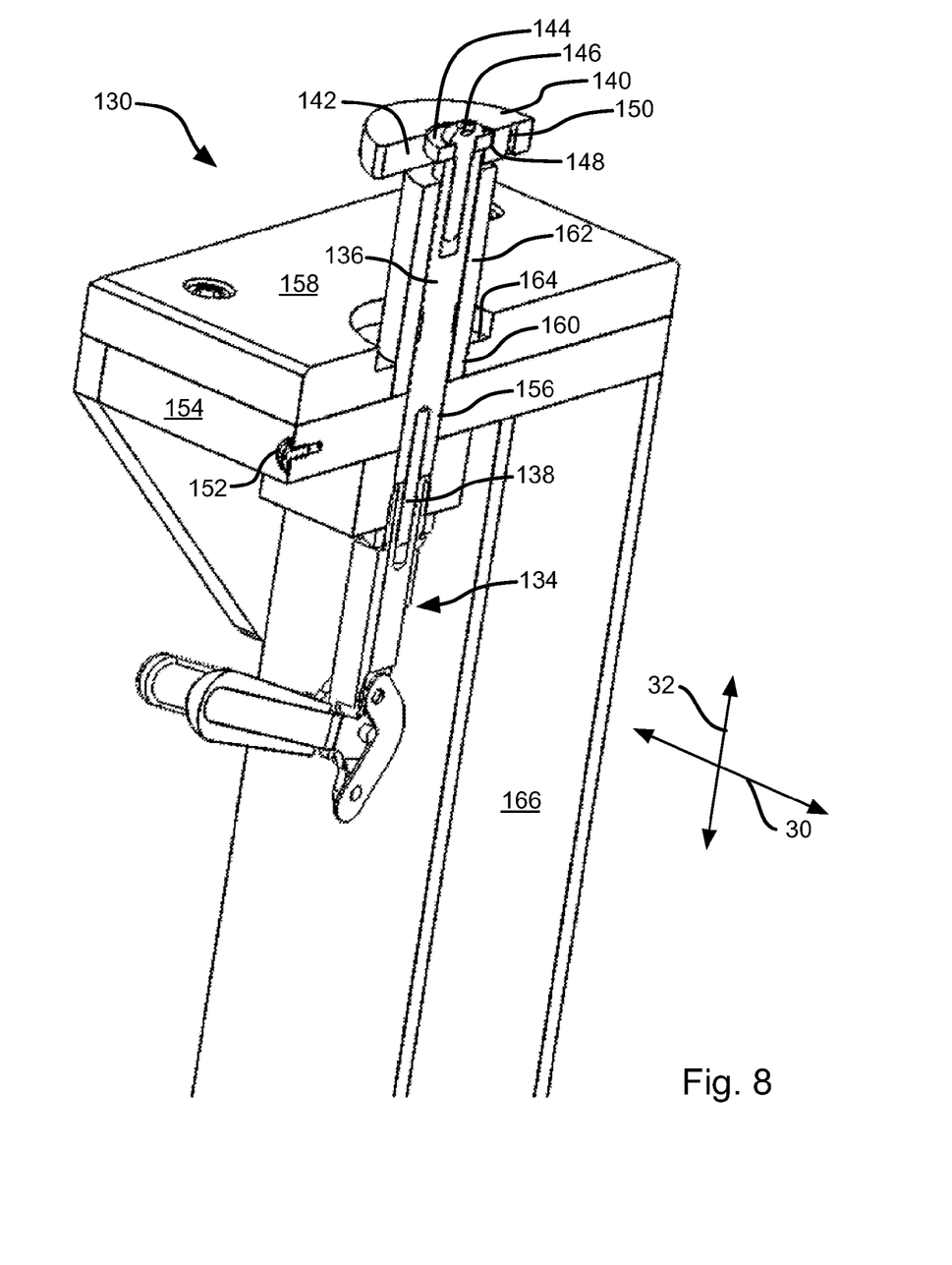
FIG. 8 is a cross-sectional view of a spar retention system in accordance with an embodiment of the present invention.

Referring to FIG. 8, as noted above, the wings 14 may be supported by means of cradles 20 as described herein. As also noted above, the cradles 20 may not provide significant resistance to longitudinal movement of the blade 20. Accordingly, the wing spar 120 may be fastened to a storage container by means of a spar retention system 130. The spar retention system 130 may be understood with respect to a longitudinal direction 132 that is substantially parallel to the longitudinal axis of the wing 14 used with the spar retention system 130. A vertical direction 32 may be defined as substantially parallel to a line parallel to a line normal to a surface on which the spar retention system 130 is resting.

The spar retention system 130 may include a lock down clamp 134 and a post 136. The lock down clamp 134 may be any lock down clamp 134 known in the art. As known in the art, a lock down clamp 134 has an open position and a closed position. The lock down clamp 134 provides a determined amount of travel between the open and closed position and may be adjustable as to travel and clamping force in the closed position. The post 136 is coupled to the lock down clamp 134, such as by means of a fastener 138. The post 136 is translated upward when the clamp 134 is moved from the closed to the open position and translated downward when the clamp 134 is moved from the open to the closed position.

A stop 140 may be selectively secured to the post 136. For example, the stop 140 may define a slot 142 sized to receive a distal portion of the post 136. The post 136 may define a distal portion that is wider than the slot 142 to hinder removal of the stop 140. For example, in the illustrated embodiment, a washer 144 or other structure secures to a distal end of the post 136, such as by means of a fastener 146, e.g. screw. In some embodiments, the stop 140 includes a seat, e.g. countersink, sized to receive the washer 144 or other widening structure. Inasmuch as the stop 140 is removable from the post, the stop 140 may include an aperture 150 or other structure for receiving a lanyard (not shown). The lanyard may be anchored to an anchor 152 secured to a base 154.

The base 154 may support a wing spar 120 secured using the spar retention system 130. The base 154 may define a rigid and substantially planar surface or have a contour corresponding to a contour of a wing spar 120. For example, the base 154 may be embodied as an aluminum plate. The base 156 may be interposed between the stop 140 and the clamp 134. The base 156 may define an aperture 156 through which the post 136 passes. In some embodiments, a cushioning member 158 secures to an upper surface of the plate 154, e.g. opposite the clamp 134 and facing the stop 140. The cushioning member 158 may define an aperture 160 through which the post 136 passes. The cushioning member 158 may be include a flexible polymer such as polyurethane or the like. The cushioning member 158 may have a modulus of elasticity such that the cushioning member 158 deforms in response to clamping force exerted by the clamp 134 on the stop 140. For example, the cushioning member 158 may have a module of elasticity of between 0.001 and 1 GPa and, preferably between 0.01 and 0.1 GPa. In some embodiments, the stop 130 may also have a modulus of elasticity within either of these ranges and may include the same or different material and have the same or different modulus of elasticity as the cushioning member 158.

A die spring 162 may encircle the post 136. The die spring 162 may be compressed by the stop 140 when the clamp 134 is in the closed position. As a result of the compression, the die spring 162 may also expand outwardly from the post 136. In some embodiments, the cushioning member 158 may define a seat 164, e.g. counterbore, that has a diameter that is larger than an undeformed diameter of the die spring 162. The seat 164 may receive a bushing or other structure secured to a wing spar 120 used in combination with the spar retention system 130. In some embodiments, the aperture 160 defined by the cushioning member 158 is slightly smaller (e.g. between 5 and 10% smaller) than an undeformed diameter of the die spring 162 passing there through. In this manner, the cushioning member 158 may hinder movement of the die spring 162 when the post 136 is moved upward and downward.

In some embodiments, the spar retention system 130 may be mounted to a container or other storage facility directly or by means of one or more intervening members. For example, the spar retention system 130 may mount to a beam 166 that secures to a container or secures to some other member mounted to the container.

Figure 9:
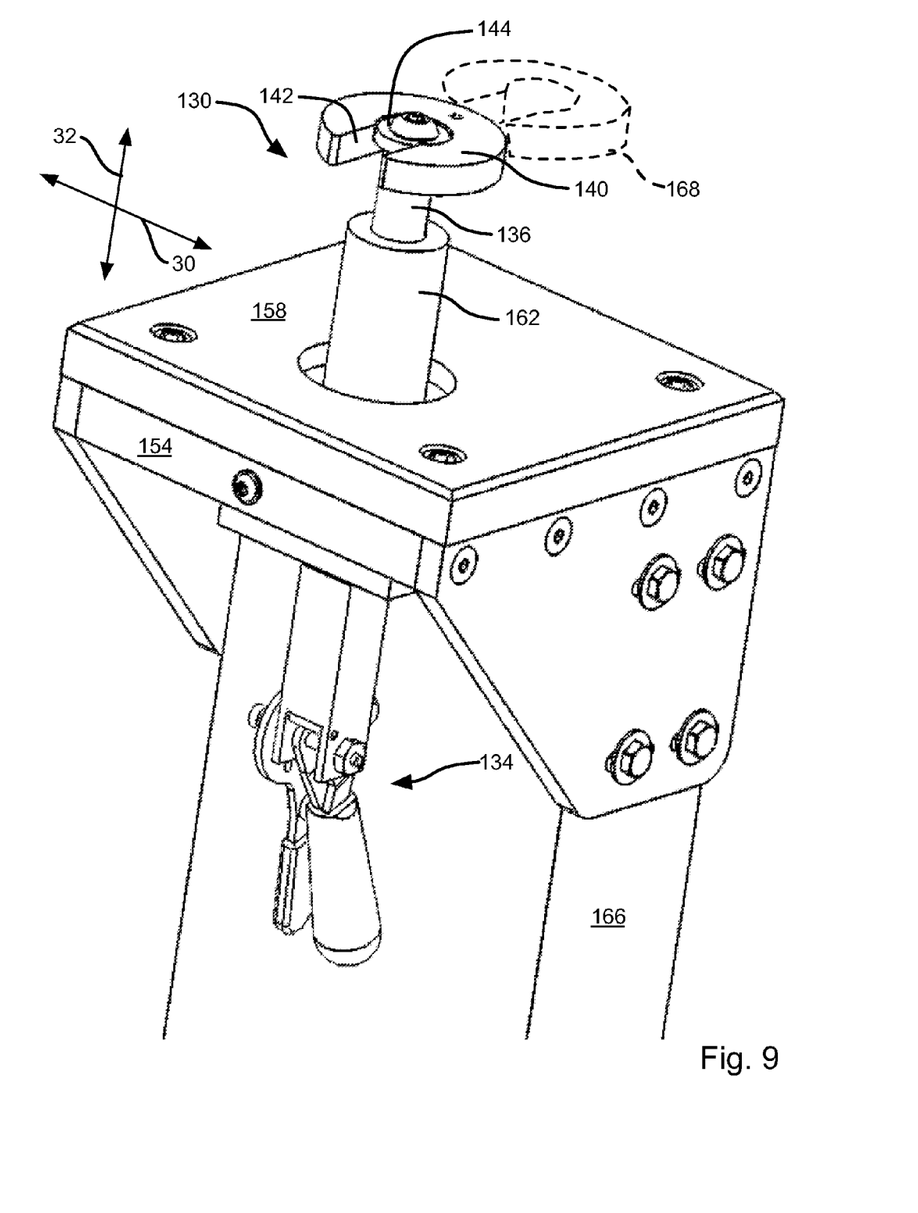
FIG. 9 is an isometric view of a spar retention system in accordance with an embodiment of the present invention.
Figure 10:
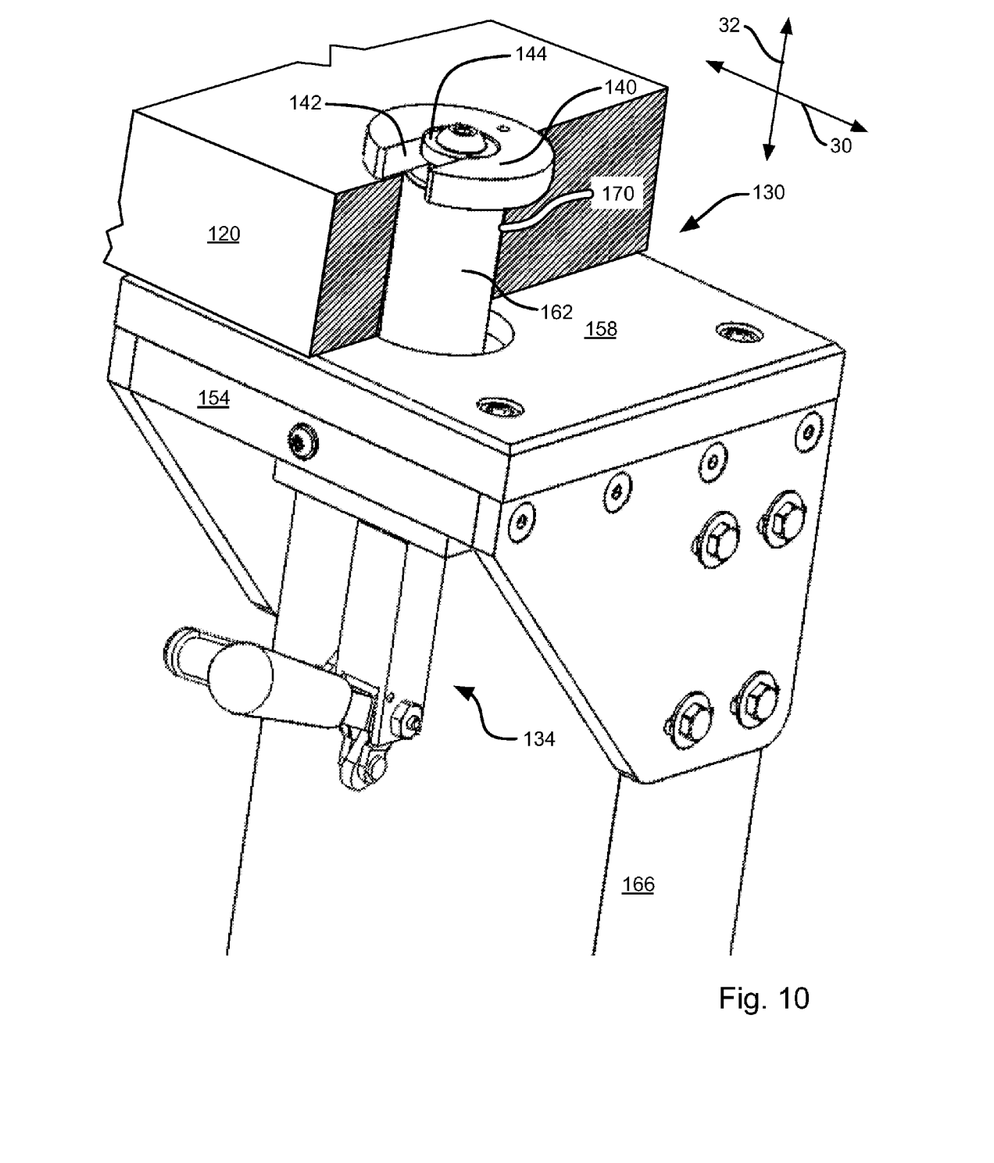
FIG. 10 is an isometric view of a spar retention system having a wing spar secured thereto in accordance with an embodiment of the present invention.

Referring to FIGS. 9 and 10, in use the stop 140 may be removed from the post 136 as shown by the dotted representation 168. Removing the post 136 may be accomplished by sliding the post 136 out of the slot 142. Where the stop 140 includes a seat 148, the stop 140 may be slid downwardly to disengage the washer 144 from the seat 148 prior to sliding the post 136 out of the slot 142. In preparation for placement of the wing spar 120, the clamp 134 may be placed at or near the open position such that the top of the post 136 is elevated above the base 154 and cushioning member 158 is not compressed and therefore small enough to insert through the wing spar 120.

Referring specifically to FIG. 10, with the stop 140 removed, a wing spar 120 may be positioned over the post 136 and die spring 162. For example, the wing spar 120 may define an aperture 170 and in the open position of the clamp 134, the uncompressed (or less compressed due to an open position of the clamp 134) die spring 162 may be sized to fit through the aperture 170 as is the washer 144. The stop 140 may be placed in the position shown having the washer 144 in the seat 148 as shown in FIG. 8 by sliding the post 136 into the slot 142. The clamp may then be moved to the closed position as shown in FIG. 10. In the closed position, the die spring 162 may be deformed such that it presses against the aperture 170 and if unconstrained by the aperture 170 would be larger than the aperture 170. In some applications, the aperture 170 is tapered or has some shape other than cylindrical. The deformation of the die spring 162 may accommodate this geometry by expanding to at least partially fill part of the aperture 170 and thereby hinder movement of the wing spar 120. The resilience of the cushioning member 158 and the stop 140 may result in deformation of these members due to the clamping force of the clamp 134 thereby reducing any scratching or denting of the wing spar 120 and providing additional grip on the wing spar 120.

Figure 11:
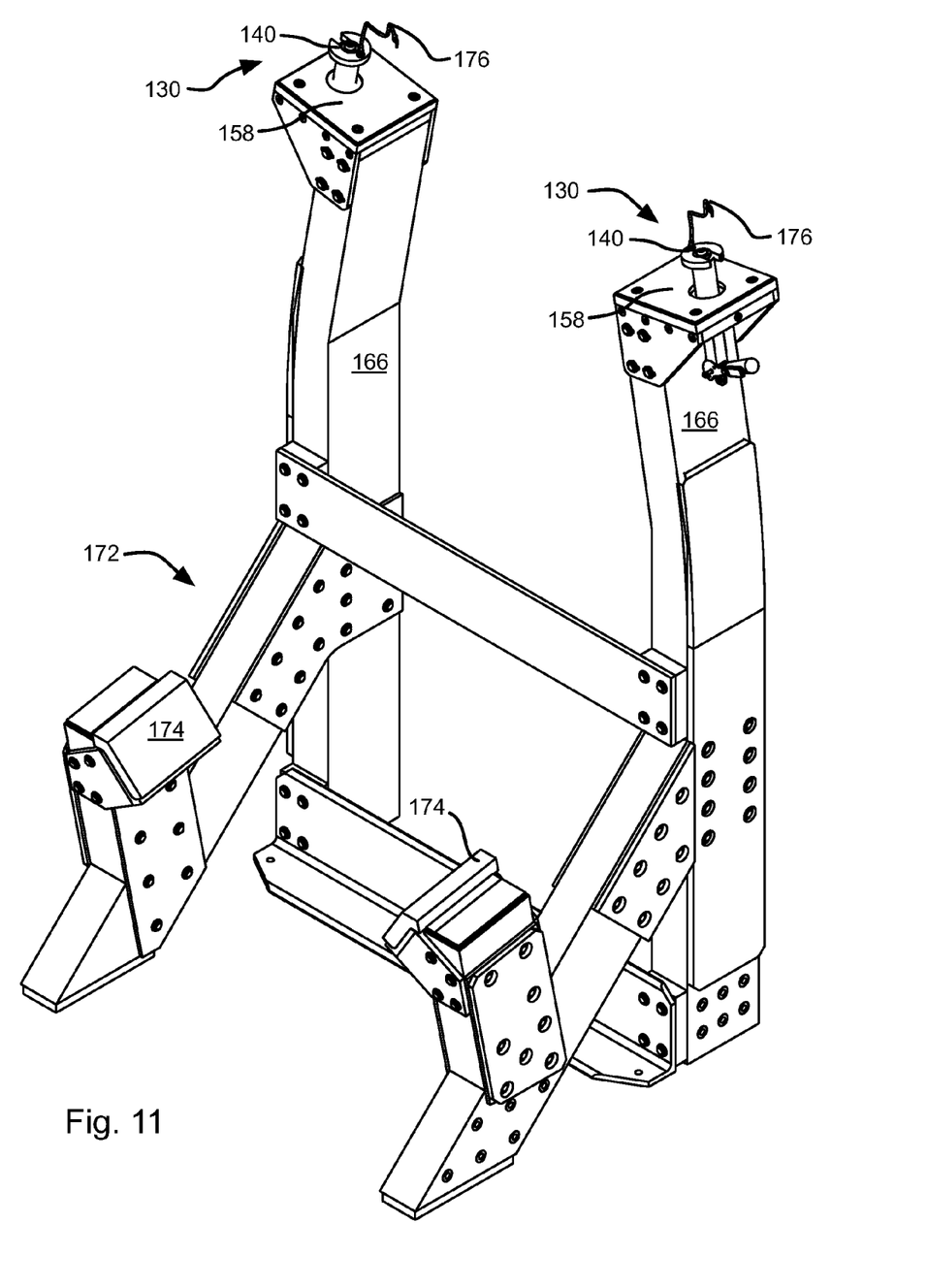
FIG. 11 is an isometric view of frame to which a spar retention system may be mounted in accordance with an embodiment of the present invention.

FIG. 11 illustrates an example use for the spar retention system 130. As illustrated the beams 166 form part of a frame 172 that is mounted to a container. In some embodiments, the frame 172 may include structures for retaining or supporting other parts of the UAV 10. For example, the frame 172 may include tail plane supports 174 that are angled or otherwise positioned to support the tail planes 18 of the UAV. The tail plane supports 174 may include cushioning surface made having some or all of the properties of other cushioning materials described herein. Also shown in FIG. 11 is a lanyard coupled to the stop 140, such as by means of the aperture 150. The lanyard may also be connected to some other portion of the frame 172 or spar retention system 130, such as the anchor 152 (FIG. 8).

Figure 12:
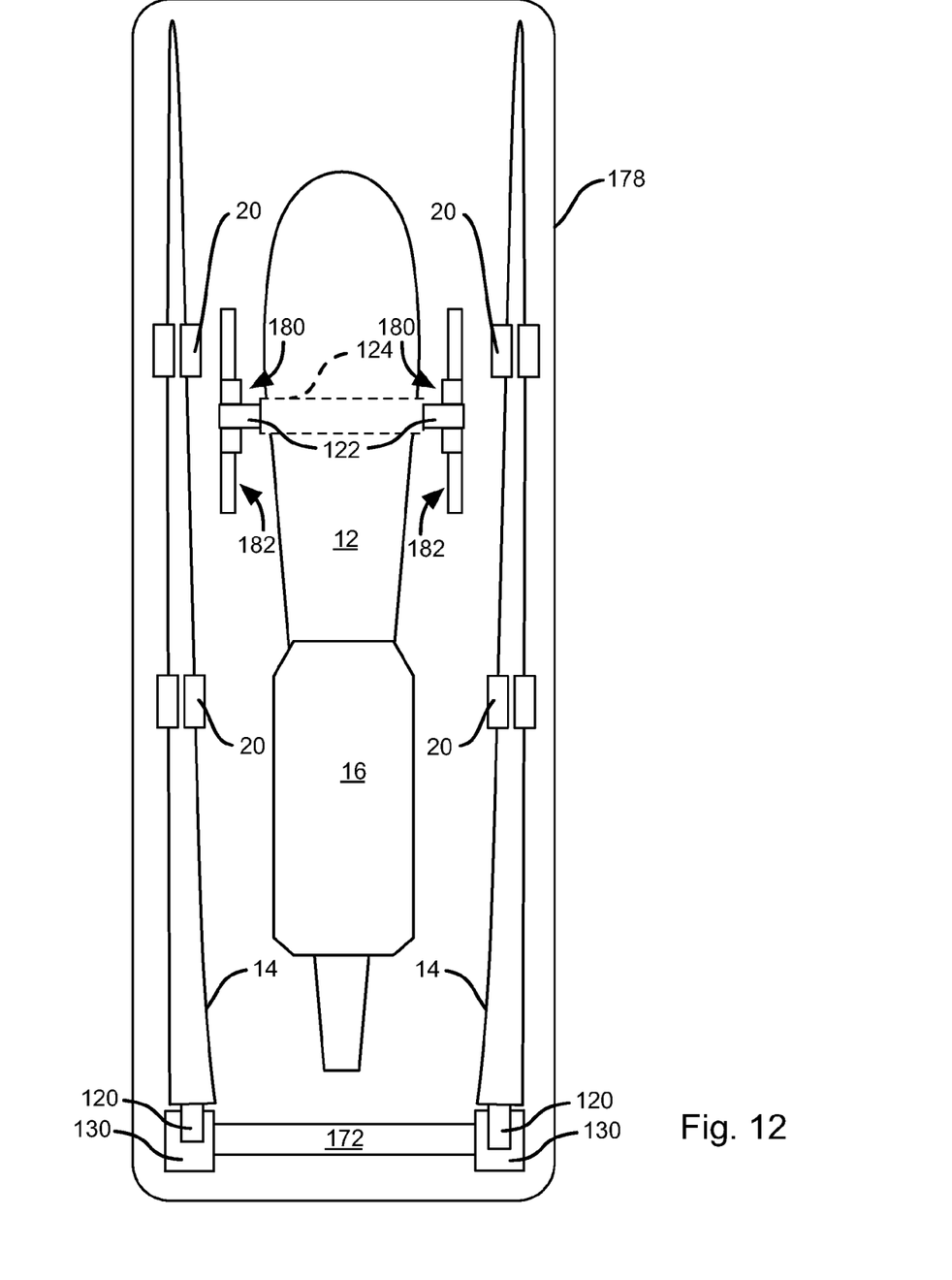
FIG. 12 is a top plan view of a disassembled UAV secured within a container in accordance with an embodiment of the present invention.

Referring to FIG. 12, the cradles 20 as disclosed herein above may be used in the storing and shipping of a UAV 10. For example, a container 178 may store a disassembled UAV 10. In such embodiments, a plurality of cradles 20 may secure to the container 178 either directly or indirectly by means of a fixture or frame member. The wing 14 mounts within the cradles 20 as described herein and is thereby retained against movement during shipping. In some embodiments, the cushioning members 40, 48, 70 may be configured relative to the end plates 38, 46, 68 such that the wing will not contact the plates 38, 46, 68 in response to deflection of the cushioning members 40, 48, 70 due to expected acceleration of the container 110. The remainder of the UAV 10 may also secure within the container 178, including the fuselage 12.

As noted above, the fuselage 14 may have a fastening system 124 and indexing members 22 secured thereto as described U.S. application Ser. No. 13/974,350 filed Aug. 23, 2013 and entitled FUSELAGE INDEXING SYSTEM AND METHOD, which is hereby incorporated herein by reference.

The container 178 may further have receivers 180 for engaging the indexing members 122 and a corresponding frame 182 mounting the receivers to the container 178 as described in U.S. application Ser. No. 13/974,350 filed Aug. 23, 2013 and entitled FUSELAGE INDEXING SYSTEM AND METHOD, which is hereby incorporated herein by reference.

The container 178 may be a container as described in U.S. application Ser. No. 13/974,322 filed Aug. 23, 2013 and entitled CLOSURE SYSTEM FOR CONTAINERS, which is hereby incorporated herein by reference.

The spar 120 of the wing 14 may be further restrained by means of the spar retention system 130 as described hereinabove. In this manner, movement of the wing 14 transverse to the longitudinal axis thereof may be restrained by means of the cradles 14 and movement along the longitudinal axis may be restrained by the spar retention system 130.

While the preferred embodiment of the invention has been illustrated and described, as noted above, many changes can be made without departing from the spirit and scope of the invention. For example, although the cradle described herein is shown being used for a wing of a fixed wing aircraft, the cradle may also be used for wings of a rotary wing aircraft, windmill blades, or other long and/or delicate structures. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A cradle for supporting a wing, the cradle comprising:
first and second clamping members pivotally coupled to one another and defining a pivot axis, the first clamping member defining a first surface and the second clamping member defining a second surface, the first and second surfaces each conforming to a portion of an airfoil contour of the wing and being formed of a cushioning material;
a first trough member defining a channel substantially parallel to the pivot axis and defining a third surface conforming to one of a leading edge and a trailing edge portion of the wing, the first trough member positioned to engage the one of the leading edge and trailing edge portion when the wing is positioned between the first and second clamping members; and
a locking member engaging the first and second clamping members and configured to selectively lock the first and second clamping members having the first and second surfaces engaging the wing;
wherein the first and second clamping members each comprise
a frame; and
a layer of the cushioning material secured to the frame;
wherein the frame includes first and second end plates and a plurality of rods secured between the first and second end plates and extending through the layer of cushioning material.

2. The cradle of claim 1, wherein the layer of cushioning material includes a plurality of cushioning members each having at least one surface that is substantially conformal to a contour of the wing at at least one longitudinal position.

3. The cradle of claim 1, wherein the layer of cushioning material extends outwardly from the first and second end plates and wherein the first and second end plates define inward facing edges that are substantially conformal to the wing at the at least one longitudinal position.

4. The cradle of claim 1, wherein the wing is a rotary wing.

5. A cradle for supporting a wing, the cradle comprising:
first and second clamping members pivotally coupled to one another and defining a pivot axis, the first clamping member defining a first surface and the second clamping member defining a second surface, the first and second surfaces each conforming to a portion of an airfoil contour of the wing and being formed of a cushioning material;
a first trough member defining a channel substantially parallel to the pivot axis and defining a third surface conforming to one of a leading edge and a trailing edge portion of the wing, the first trough member positioned to engage the one of the leading edge and trailing edge portion when the wing is positioned between the first and second clamping members;
a locking member engaging the first and second clamping members and configured to selectively lock the first and second clamping members having the first and second surfaces engaging the wing; and
a second trough member, the first and second clamping members being positioned between the first and second trough members.

6. The cradle of claim 5, wherein the first and second trough members each have a longitudinal width at least as great as a longitudinal width of the first and second clamping members.

7. A cradle for supporting a wing, the cradle comprising:
first and second clamping members pivotally coupled to one another and defining a pivot axis, the first clamping member defining a first surface and the second clamping member defining a second surface, the first and second surfaces each conforming to a portion of an airfoil contour of the wing and being formed of a cushioning material;
a first trough member defining a channel substantially parallel to the pivot axis and defining a third surface conforming to one of a leading edge and a trailing edge portion of the wing, the first trough member positioned to engage the one of the leading edge and trailing edge portion when the wing is positioned between the first and second clamping members; and
a locking member engaging the first and second clamping members and configured to selectively lock the first and second clamping members having the first and second surfaces engaging the wing;
wherein the second clamping members is fixedly secured to a shipping container and the first trough is fixedly secured to the second clamping member.

8. A cradle for supporting a wing, the cradle comprising:
first and second clamping members pivotally coupled to one another and defining a pivot axis, the first clamping member defining a first surface and the second clamping member defining a second surface, the first and second surfaces conforming to a portion of an airfoil contour of the wing and being formed of a cushioning material, the first and second clamping members each including:
first and second end plates;
one or more cushioning members positioned between the first and second end plates; and
one or more rods secured to the first and second end plates and extending through the one or more cushioning members; and
a locking member engaging the first and second clamping members and configured to selectively lock the first and second clamping members having the first and second surfaces engaging the wing.

9. The cradle of claim 8, wherein the one or more cushioning members each have at least one surface that is conformal to a contour of the wing at at least one longitudinal position.

10. The cradle of claim 9, wherein the at least one surface is formed by waterjet cutting.

11. The cradle of claim 9, wherein the at least one surface of the one or more cushioning members extends inwardly the first and second end plates and the first and second end plates define inward facing edges that are substantially conformal to the wing at the at least one longitudinal position.

12. The cradle of claim 8, further comprising first and second trough members positioned on either side of the first and second clamping members, the first and second trough members each defining a channel substantially parallel to the pivot axis and defining a third surface conforming to one of a leading edge portion and a trailing edge portion of the wing, the first and second trough members being positioned to engage the one of the leading edge and trailing edge when the wing is positioned between the first and second clamping members.

13. The cradle of claim 12, further comprising a third end plate secured to the first end plate and a fourth end plate secured to the second end plate, the first trough member being positioned between the first end plate and the third end plate and the second trough member being positioned between the second end plate and the fourth end plate.

14. The cradle of claim 13, wherein the one or more cushioning members are one or more first cushioning members, the first trough further comprising one or more second cushioning members positioned between the first end plate and the third end plate and the second trough further comprising one or more third cushioning members positioned between the second end plate and the fourth end plate.

15. The cradle of claim 8, wherein the first and second clamping members further include:
a locking mount positioned between the first and second end plates such that at least one of the one or more rods passes through the locking mount;
wherein the one or more cushioning members include a cutout portion sized to receive the locking mount; and
wherein the locking member is fastened to the locking mounts of the first and second clamping members.

16. A method for shipping an unmanned aerial vehicle having at least one wing, the method comprising:
providing a plurality of cradles each having first and second clamping members pivotally coupled to one another and defining a pivot axis, the first clamping member defining a first surface and the second clamping member defining a second surface, the first and second surfaces conforming to an airfoil contour of the wing and being formed of a cushioning material, a first trough member defining a channel substantially parallel to the pivot axis and defining a third surface conforming to one of a leading edge and a trailing edge portion of the wing, the first trough member positioned to engage the one of the leading edge and trailing edge portion when the wing is positioned between the first and second clamping members, and a locking member engaging the first and second clamping members and configured to selectively lock the first and second clamping members having the first and second surfaces engaging the wing;
positioning the first and second clamping members of the plurality of cradles around the wing at a plurality of positions;
locking the first and second clamping members of the plurality of cradles using the locking members thereof; and
fastening the cradles to a shipping container
wherein the first and second clamping members each comprise—
a frame; and
a layer of the cushioning material secured to the frame;
wherein the frame includes first and second end plates and a plurality of rods secured between the first and second end plates and extending through the layer of cushioning material.

17. The method of claim 16, wherein the plurality of cradles each further include a first trough member defining a channel substantially parallel to the pivot axis and defining a third surface conforming to one of a leading edge and a trailing edge portion of the wing, the first trough member positioned to engage the one of the leading edge and trailing edge portion when the wing is positioned between the first and second clamping members, the method further comprising:
positioning the at least one of the leading edge and trailing edge portion of the wing into the troughs of the plurality of cradles prior to locking the first and second clamping members of the plurality of cradles.

18. The method of claim 16, wherein the first and second clamping members each include, first and second end plates, one or more cushioning members positioned between the first and second end plates, and one or more rods secured to the first and second end plates and extending through the one or more cushioning members, the one or more cushioning members extending outwardly from the first and second end plates; and
wherein locking the first and second clamping members of the plurality of cradles using the locking members thereof comprises applying a locking force to the first and second members effective to compress the one or more cushioning members such that the first and second end plates do not contact the wing.

* * * * *